United States Patent
Garfield et al.

[11] 3,826,888
[45] July 30, 1974

[54] DEEP NARROW GAP WELDING TORCH

[75] Inventors: Gerald Garfield; Cecil H. Rout, both of Seal Beach, Calif.

[73] Assignee: McDonnell Douglas Corporation, Santa Monica, Calif.

[22] Filed: Mar. 5, 1973

[21] Appl. No.: 338,104

[52] U.S. Cl............... 219/74, 219/130, 219/136
[51] Int. Cl.............................................. B23k 9/16
[58] Field of Search ............ 219/146, 137, 130, 74, 219/126, 73, 136

[56] References Cited
UNITED STATES PATENTS

| | | | |
|---|---|---|---|
| 2,694,764 | 11/1954 | Muller | 219/74 |
| 3,053,968 | 9/1962 | Gorman et al. | 219/74 |
| 3,123,702 | 3/1964 | Keidel et al. | 219/74 |
| 3,172,942 | 3/1965 | Keller | 219/130 |
| 3,239,648 | 3/1966 | Syrigos | 219/74 |
| 3,296,412 | 1/1967 | Waite et al. | 219/73 |
| 3,328,556 | 6/1967 | Nelson et al. | 219/125 R |
| 3,352,993 | 11/1967 | Suzuki et al. | 219/73 |
| 3,502,841 | 3/1970 | Heer | 219/130 |

Primary Examiner—J. V. Truhe
Assistant Examiner—Clifford C. Shaw
Attorney, Agent, or Firm—Robert O. Richardson; Walter J. Jason; Donald L. Royer

[57] ABSTRACT

A welding torch adapted for welding deep narrow gaps wherein shielding gas diffusers fit inside the welding groove, a plastic liner is placed deep inside the torch so electric contact between the filler wire and contact tube is close to the exit, and a zirconia oxide insulation prevents torch contact with the gap walls.

5 Claims, 5 Drawing Figures

PATENTED JUL 30 1974          3,826,888

3,826,888

DEEP NARROW GAP WELDING TORCH

BACKGROUND OF THE INVENTION

In the welding together of thick parts on the order of 1 inch and more, the abutting edges to be welded have been machined to form a V-shaped groove which is then filled with a consumable welding wire in the welding operation. However, shrinkage occuring across the gap will cause a heavy cross-sectional part to bend or warp at the weld. To overcome this problem, double V-shaped grooves were made with the parts abutting at the middle of the part thickness. Thus, weld shrinkage on both sides counteracted each other and warpage or bending did not occur. However, this extra welding required additional time, preparation, filler material, shielding gas, all of which increased welding costs. Moreover, a massive heat effected zone was created which reduced the strength of the parent metal.

SUMMARY OF PRESENT INVENTION

In the practice of the present invention the parts to be welded have parallel uniformly spaced surfaces between which filler wire is built up from the bottom of the gap through successive passes. The edges require little preparation and a minimum of welding is needed.

A torch for deep narrow gap welding needs to be water cooled to prevent heat build-up and should be gas shielded within the gap. The current transfer from the torch to the welding wire should occur close to the tip to prevent galling or intermittant arcing from occurring as the welding wire is fed down a metal contact tube. This is done through the installation of an insulator tube over the wire and extending to about 1 inch from the tip. Outside insulation on the torch prevents its contact with the gap walls. The welding wire feed tube is bent to the side to facilitate welding in a herringbone pattern.

DETAILED DESCRIPTION OF ILLUSTRATIVE EMBODIMENT

Figure 1:
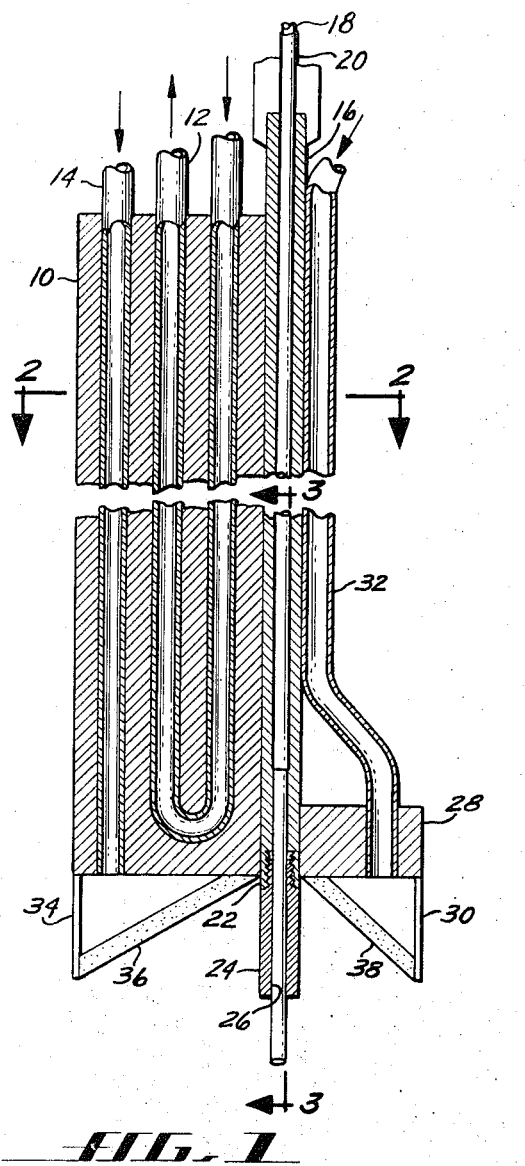
FIG. 1 is a sectional side view of the welding torch.

Referring now to FIG. 1 there is shown a welding torch comprising a copper body 10 having a water cooling tube 12 and an inert gas insertion tube 14 therein. Along the front edge of body 10 is a welding wire feed tube 16 through which welding wire 18 is fed. An insulative insert 30 such as Teflon for example extends downwardly nearly to the tip 22 to prevent electrical contact of the wire 18 except near its end to prevent galling and wire feed failure due to metal to metal arcing as wire passes down a metal tube. Insulation to within approximately 1 inch from the end has been found to be satisfactory. A contact tube tip 24 is threadedly engageable with tube end 22 and has an oriface 26 of a size to accommodate the size of welding wire to be used. For example, an oriface of 0.057 inch is suitable for a three thirty-seconds welding wire and an oriface of 0.080 inch is suitable for one-sixteenth wire.

An extension 28 on the front and lower end of body 10 is for the purpose of mounting a front shield 30 and an inert shielding gas insertion tube 32 communicating therewith. Insertion tube 14 communicates with rear shield 34. Both shields have porous sintered bronze lower surfaces 36, 38 which pass inert gas to the welding area.

Figure 2:
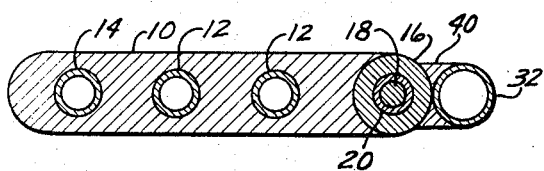
FIG. 2 is a plan view taken along the line 2—2 of FIG. 1.

FIG. 2 is a plan view showing the torch body 10 to be long and narrow so that is may fit within the gap between two thick pieces to be welded. The entrance and return portions of water coolant tube 12 are centrally positioned for optimum cooling and the inert gas tubes 14 and 32 are conveniently positioned near each end. Gas tube 32 is shown brazed at 40 to the wire feed tube 16 at the front of body 10. The insulative liner 20 is shown within feed tube 16. The outer surface is coated with zirconium oxide to form a heat resistant insulation.

Figure 3:
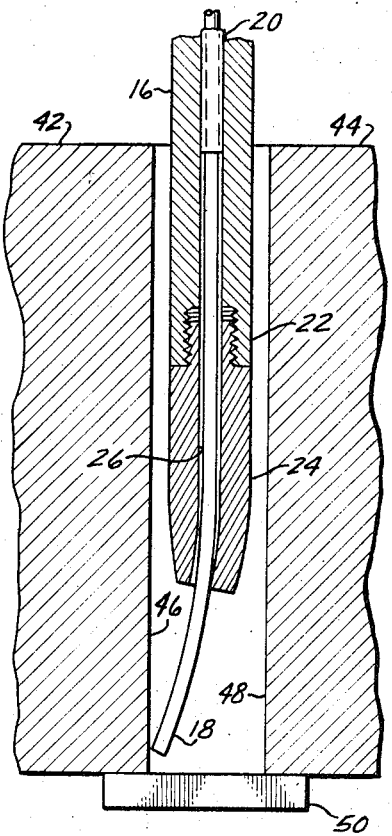
FIG. 3 is a front elevational view taken along the line 3—3 of FIG. 1.
Figure 4:
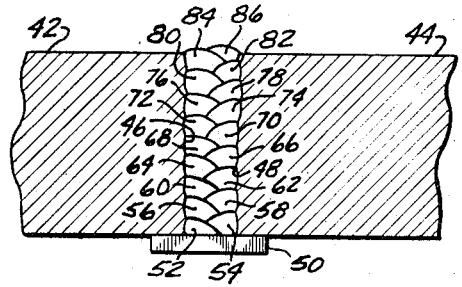

Shown in FIG. 3 are two parts 42, 44 to be welded. Their ends 46, 48 form a narrow gap closed at its bottom end by an enclosure strip 50. Feed tube 16 with contact tube tip 24 fastened on the end is positioned within the gap with the end of welding wire 18 adapted to pass therethrough at an angle. The bore or oriface 26 of tip 24 is angularly oriented for this purpose. By passing the torch along the gap with wire 18 directed toward end 46 and then toward end 48, on alternate passes, a herringbone configuration weld can be achieved. Such a configuration is shown in FIG. 4 where successive welds 52 to 86 inclusive are made in an overlapping arrangement to fill the gap between the workpieces 42, 44.

Figure 5:
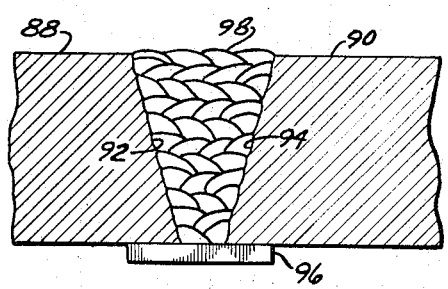
FIG. 4 and FIG. 5 are sectional views of welds made with the torch.

FIG. 5 shows in cross-section a welding of thick parts 88, 90 having tapered edges 92, 94. The welding operation is quite similar to that shown in FIG. 4 in that an enclosure plate 96 is placed on the bottom of the V-shaped gap. Thereafter the herringbone pattern of welding is applied along the bottom and then successively built up in rows of weld material 98 until the gap is filled.

Having thus described an illustrative embodiment, alternate forms will occur to one skilled in the art and it is to be understood that these variations are to be considered as part of the present invention as set forth in the appended claims.

We claim:

1. A deep narrow gap welding torch in combination with relatively thick parts to be welded together, said parts having spaced surfaces defining a deep narrow gap between the parts, said torch including:
   a thin elongated electrically conductive body portion with the lower end thereof positioned within said gap between said parts to be welded,
   said body portion having outside surfaces capable of contact with said parts when inserted therebetween, said outside surfaces being coated with an electrical insulation to prevent electrical conduction between said parts and said body portion,
   said body portion having gas connection means for connection to a gas source and electrical connection means for connection to a welding power source,
   said body portion having an inert gas shield on the bottom thereof to receive inert gas from said gas connection means, said shield having sintered metal openings through which said inert gas may pass into a weld area within said gap, an electrode filler weld wire feed tube extending downwardly on said body portion, and in electrical contact therewith, said tube having a detachable tip thereon through which filler weld wire passes into said weld area, said feed tube having filler weld wire therein, said feed tube being electrically conductive and having insulation therein around said wire and extending downwardly and terminating near the lower end thereof to permit electrical contact only near the lower end of said tube with said wire.

2. A deep narrow gap welding torch as in claim 1 wherein said detachable tip has an orifice angularly directed relative to said body portion to direct said weld wire toward one of said surfaces to be welded when said torch is in operative position with the bottom of the body portion thereof within said gap.

3. A deep narrow gap welding torch as in claim 1 wherein said inert gas shield includes a front shield positioned forwardly of said tip within said gap and a rear shield positioned rearwardly of said tip within said gap, and inert gas insertion lines connected to said gas connection means and to both said shields.

4. A deep narrow gap welding torch as in claim 3 wherein an inert gas insertion line extends downwardly, forwardly of and adjacent to said weld wire feed tube.

5. A deep narrow gap welding torch as in claim 1 wherein the wire feed tube extends downwardly along the foreward edge of said body portion.

* * * * *